Burnham & Lathrop,
Cultivator.

No. 57,858. Patented Sept. 11, 1866.

Witnesses:

Inventor:
John Burnham
W. C. Lathrop
By Munn & Co
atty

UNITED STATES PATENT OFFICE.

JOHN BURNHAM AND WILLIAM C. LATHROP, OF LA SALLE, ILLINOIS.

IMPROVEMENT IN CULTIVATORS.

Specification forming part of Letters Patent No. 57,858, dated September 11, 1866.

*To all whom it may concern:*

Be it known that we, JOHN BURNHAM and W. C. LATHROP, of La Salle, in the county of La Salle and State of Illinois, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1:
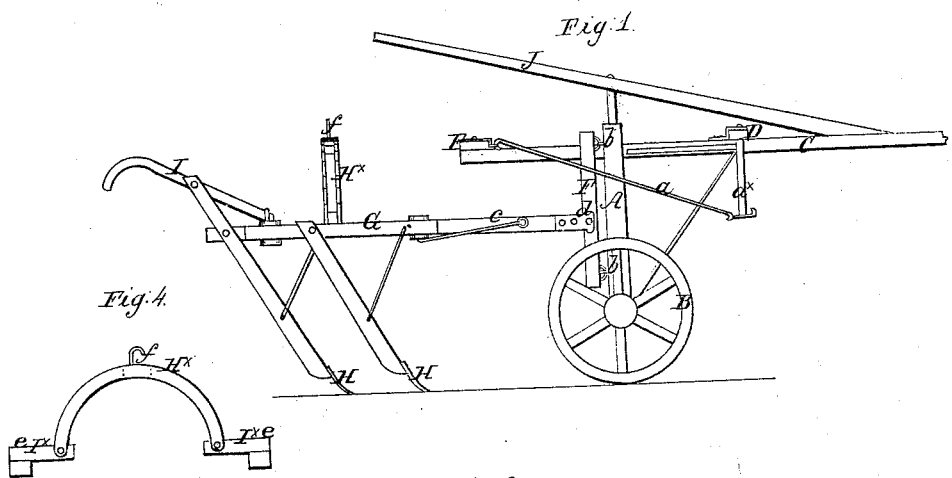
Figure 4:
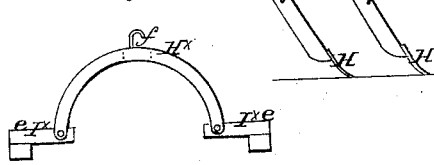
Figure 2:
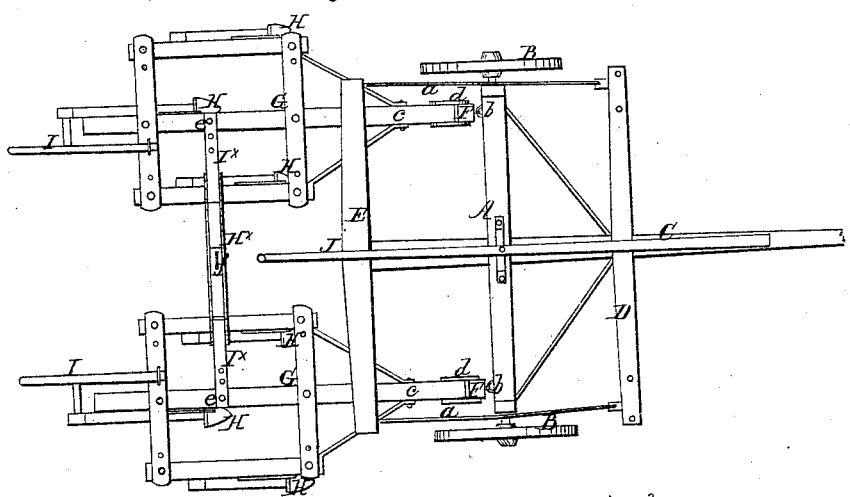
Figure 3:
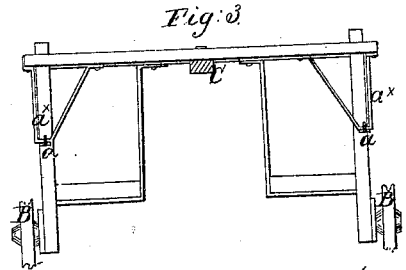

Figure 1 is a side view of our invention; Fig. 2, a plan or top view of the same; Fig. 3, a detached front view of the main frame of the same; Fig. 4, a detached view of the coupling for the plow-frames pertaining to the same.

Similar letters of reference indicate like parts.

This invention relates to a new and improved cultivator of that class in which the plows are arranged so as to be adjustable both laterally and vertically; and it consists in a novel arrangement of the parts, as hereinafter fully shown and described, whereby the device may be manipulated with the greatest facility, the team relieved of weight on the neck, and the device rendered capable of being converted into a single or double one for plowing one or two rows of plants, as may be desired.

A represents an upright rectangular frame, to the lower ends of which wheels B B are attached, one at each side, and having the rear part of the draft-pole C secured to its upper part.

D is a double-tree, attached to the draft-pole C just in front of frame A, and connected at each end, by a rod, $a$, with a double-tree, E, at the rear end of the draft-pole, behind the frame A, the whiffletrees being attached to the ends of pendants $a^x$ at the front double-tree, D, the front ends of the rods $a$ being also connected to the pendants $a^x$. This frame A is well braced from the draft-pole C, and to the rear side of the frame A there are secured, by joints $b$, two upright bars, F F, one near each end of frame A, the joints $b$ admitting of the bars F turning to the right and left. To these bars F F the beams $c\ c$ of the plow-frames G G are attached by joints $d\ d$, which admit of the beams rising and falling or working in a vertical direction. (See Figs. 1 and 2.)

There are three plows, H, attached to each frame G, arranged in the usual way, and each frame is provided with a handle, I.

The two frames G G are connected by an arched or semicircular yoke, $H^x$, the ends of which are pivoted to bars I I, which are secured on the tops of the plow-frames G G by pivots $e$; the bars being allowed to turn freely on the pivots $e$.

By this arrangement it will be seen that the plow-frames are rendered capable of being moved up and down, or in a vertical direction, and also capable of being moved laterally, or to the right and left.

The plow-frames are allowed to move up and down independently of each other, so that they may conform to the inequalities of surface over which they may pass; and the plows may be held up out of the ground by placing a hook, $f$, in the yoke $H^x$ over an inclined bar, J, attached to the draft-pole C and frame A.

The lateral movement of the plow-frames admits of the plows being made to conform to the sinuosities of the rows of plants.

The mounted frame A prevents any weight bearing on the necks of the animals.

In using the device the plows of each frame work at opposite sides of a row of plants, the animals being in the spaces between the rows; hence one row will be plowed at each side, and the two adjoining rows at each side plowed at one side, which is equivalent to plowing two rows simultaneously.

If it be desired to plow only one row of plants at a time, the outer plows of each frame G may be detached.

The duplex double-tree arrangement admits of an even draft.

Having thus described our invention, we claim as new and desire to secure by Letters Patent—

1. The attaching of the plow-frame G to an upright mounted frame, A, by means of joints $d$ and bars F, arranged, as shown, to form a universal-joint connection, to admit of the vertical and lateral movement of the plows, substantially as described.

2. The connecting of the two plow-frames G G by means of a yoke, H$^\times$, having its ends pivoted to bars I$^\times$ I$^\times$, which are secured horizontally on the frames G G by pivots $e$, to admit of the frames G rising and falling independently of each other, as set forth.

3. The duplex double-tree arrangement composed of the two double-trees D E, attached to the draft-pole C, and connected by the rods $a$, substantially as described.

The above specification of our invention signed by us this 14th day of September, 1865.

JOHN BURNHAM.
W. C. LATHROP.

Witnesses:
W. M. HITT,
C. S. MILLER.